United States Patent [19]
Whitley, Jr.

[11] 3,827,717
[45] Aug. 6, 1974

[54] PROW TIE-DOWN DEVICE FOR BOAT TRAILERS

[76] Inventor: William P. Whitley, Jr., 4525 E. 10th Ln., Hialeah, Fla. 33013

[22] Filed: Jan. 15, 1973

[21] Appl. No.: 323,534

[52] U.S. Cl.............. 280/179 R, 267/73, 280/414
[51] Int. Cl.............................................. B60p 7/08
[58] Field of Search............ 280/414, 179 R, 179 A; 248/361 A, 361 R, 25; 267/73, 34; 188/282; 214/505, 566

[56] References Cited
UNITED STATES PATENTS

| | | | |
|---|---|---|---|
| 573,534 | 12/1896 | Raders | 267/73 |
| 2,462,964 | 3/1949 | Heggen | 280/414 B |
| 2,585,413 | 2/1952 | Simpson | 267/34 X |
| 2,586,485 | 2/1952 | Schroeder | 280/414 R X |
| 2,915,991 | 12/1959 | Koth et al. | 248/361 |
| 3,402,961 | 9/1968 | Larson | 296/23 |

*Primary Examiner*—Leo Friaglia
*Assistant Examiner*—Randall A. Schrecengost
*Attorney, Agent, or Firm*—Ernest H. Schmidt

[57] ABSTRACT

A tie-down device for yieldingly attaching the prow of a boat to the framework of a boat trailer so as to minimize relative movement therebetween during trailering, is described. A single-acting hydraulic unit is connected in tandem with helical tension springs and in series with a turnbuckle; and attachment means is provided at each end for connection between the winch eye at the prow of a boat and the framework of the boat trailer on which the boat is cradled. The device is slow acting in the direction of expansion due to the dampening effect of the hydraulic unit, while at the same time affording quick return to normal, withdrawn position upon the release of stress, thereby minimizing bouncing of the boat on the trailer while being trailered over rough terrain.

3 Claims, 3 Drawing Figures

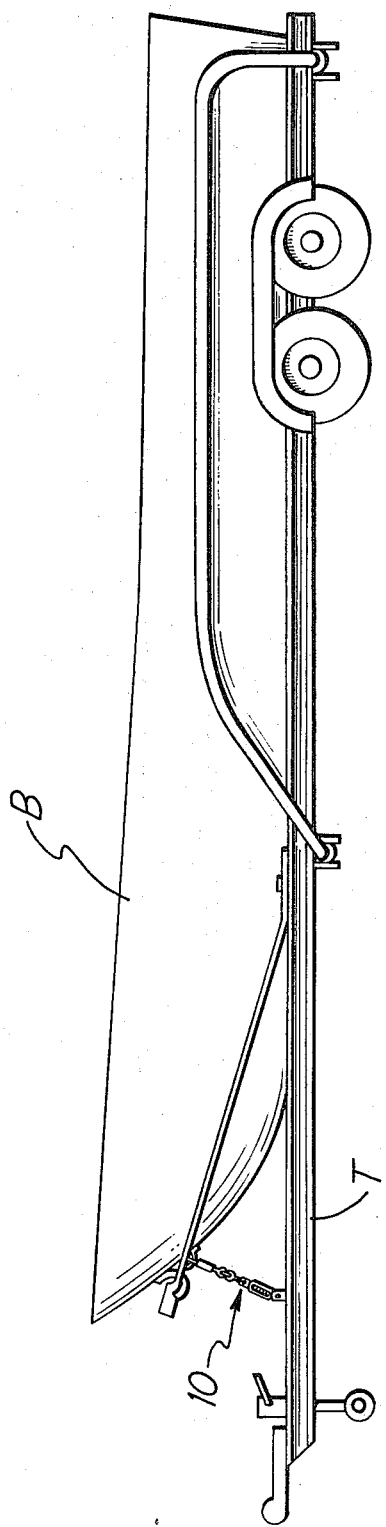

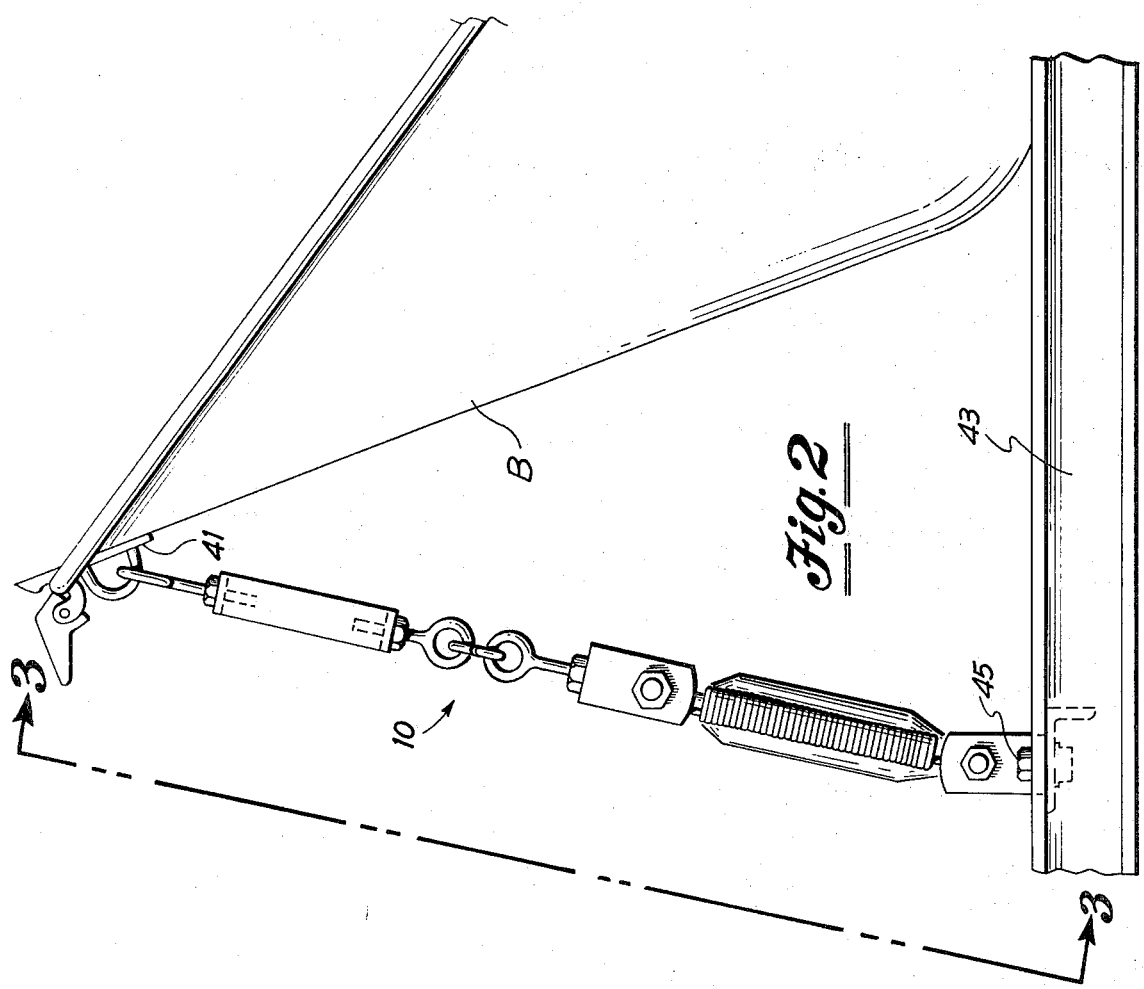
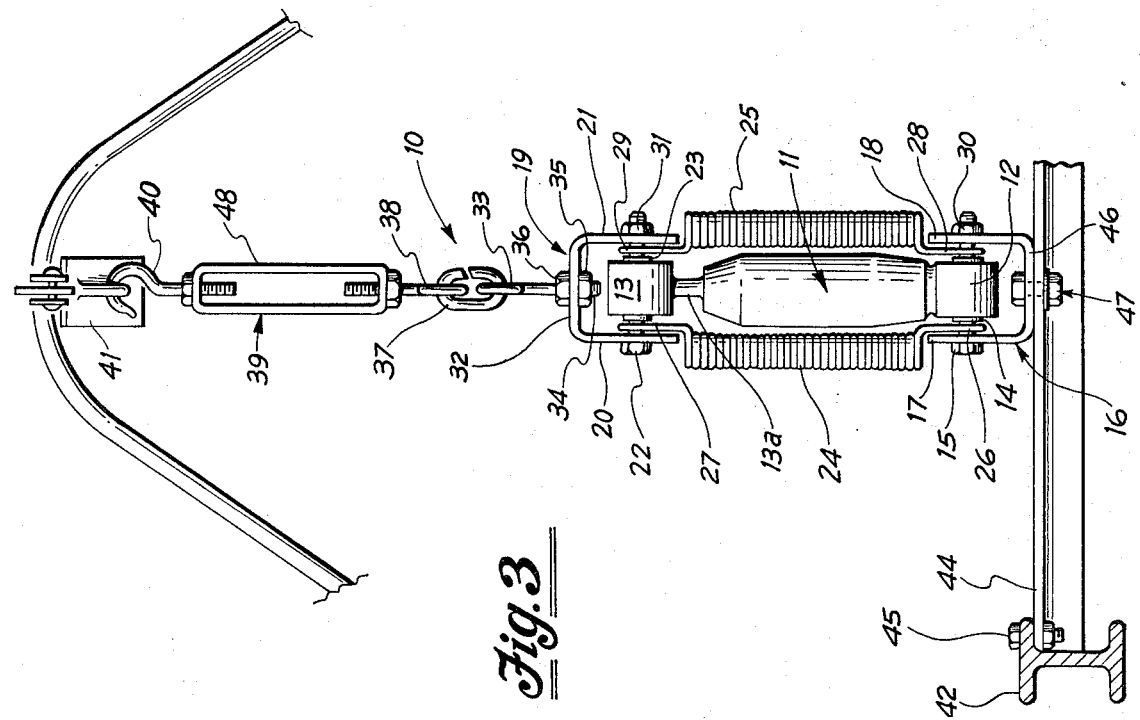

PROW TIE-DOWN DEVICE FOR BOAT TRAILERS

This invention relates to boat trailers and is directed particularly to attachment mechanism acting between the prow of a trailered boat and the trailer framework for dampening relative movement of the boat while being transported over rough or uneven ground or roadways.

In my U.S. Pat. No. 3,632,138, issued Jan. 4, 1972, I describe an immersible boat trailer with a boat cradling framework and latching means at the prow of the boat for securing the boat against longitudinal movement with respect to the trailer. The present invention is directed to a tie-down mechanism for minimizing and snubbing or dampening relatively vertical movement of the prow of a boat being trailered by such boat trailers while traveling over rough or uneven terrain, especially when traveling at high speeds.

The principal object of this invention is to provide a prow tie-down mechanism of the character described which is slow-acting in the direction of movement of the trailer boat away from the trailer framework in the vertical direction, but fast-acting in the return direction, thereby preventing substantial relative motion under short term stress conditions while at the same time providing for relative movement under relatively long term and substantial stress conditions as occasioned, for example, by movement of the trailer over a large pothole.

Another object of the invention is to provide a prow tie-down mechanism of the above nature which has a quick return action to insure complete reseating of the boat in its trailer cradle after the stress between the boat and the trailer is relieved, thereby minimizing any tendency to bouncing of the boat in the trailer while being trailered over rough terrain.

A more particular object of the invention is to provide a prow tie-down mechanism of the character described which is connectable between the prow of a boat and the framework of a trailer carrying the boat, and which includes a single-acting hydraulic unit combined with helical tension springs for impeding expansion of the tie-down mechanism while at the same time providing for quick return thereof to normal, securing position after expansion.

Still another object of the invention is to provide a prow tie-down mechanism including a series-connected turnbuckle for adjustably securing the mechanism in place.

Another object of the invention is to provide a prow tie-down mechanism which will be simple in construction, economical to manufacture, easy to apply, durable in use and effective in operation.

Other objects, features and advantages of the invention will be apparent from the following description when read with reference to the accompanying drawings. In the drawings, wherein like reference numerals denote corresponding parts throughout the several views:

FIG. 1 is a side elevational view of a boat trailer carrying a boat and equipped with a boat prow tie-down mechanism;

FIG. 2 is a side elevational view of the boat prow tie-down mechanism illustrated in FIG. 1, on an enlarged scale and showing fragmentary portions of the trailer and boat to which it is attached; and FIG. 3 is a front elevational view taken along the plane indicated at 3—3 of FIG. 2 in the direction of the arrows.

Referring now in detail to the drawings, reference numeral 10 designates, generally, a prow tie-down mechanism embodying the invention, the same being illustrated in FIG. 1 in its position of use interconnecting the prow of a boat cradled for transporting on a boat trailer T of the type, for example, illustrated and described in my above-mentioned Pat. No. 3,632,138. As best illustrated in FIGS. 2 and 3, the prow tie-down mechanism 10 comprises a single-acting hydraulic unit 11 having connector ends 12 and 13. The hydraulic member 11 may be of the usual type having a piston joined to the connector end 13 as by a piston rod 13a and slidable in a cylinder forming part of the other connector end 12, which includes hydraulic fluid and valve means permitting slow bleeding as the two ends are separated, while providing for fast return of the piston in the opposite or withdrawn position. Since the construction and operation of such single-acting hydraulic or pneumatic devices is known, further description thereof is not deemed necessary herein for a full understanding of the invention.

The connector end 12 of the hydraulic unit 11 is provided with a transversely-disposed, diametrically-extending cylindrical bearing sleeve 14 through which a journal pin in the form of a bolt 15 extends. The bolt 15 pivotally secures the hydraulic unit 11 to a U-shaped bracket member 16, the opposing legs 17 and 18 of which straddle the hydraulic unit connector end 12 and are provided with openings for the passage of said journal bolt. To provide for pivotal connection to the opposite or piston connector end 13 of the hydraulic member 11, a U-shaped bracket member 19 similarly straddles said connector end with its opposed leg portions 20,21 fitted with a journal bolt 22 extending through a bearing sleeve 23.

Means is provided for resiliently restraining the hydraulic member 13 in its withdrawn position. To this end, a pair of helical tension springs 24, 25 are provided, one at each side of the hydraulic unit 11 and each of which is provided with outwardly-extending hook connector portions 26, 27 and 28, 29, respectively, hookingly engaged over outwardly-extending portions of the journalling bolts 15 and 22 between the connector ends 12 and 13 of the said hydraulic unit and the insides of the leg portions of the U-shaped brackets 16 and 19. Upon assembly of the above-described mechanism, the journalling bolts 15 and 22 are secured in place as by nuts 30 and 31, respectively.

One of the U-shaped bracket members, the bracket member 19 associated with the cylinder connector end 13 of the hydraulic unit 11 as illustrated in the drawings, is provided in its web portion 32 with a central, through opening for the connection thereto of an outwardly-extending eye 33, said eye being provided with a threaded shank 34 extending through said opening and secured in place by opposing lock-nuts 35 and 36. Elongated link member 37 connects the eye 33 with the eye 38 at one end of a turnbuckle 39. The other end of the turnbuckle 39 is provided with a hook 40 adapted for hooking interconnection with the usual winching eye fitting 41 at the prow of the boat, as is hereinbelow more particularly described.

In use, the prow tie-down mechanism 10 is connected between the prow of the boat and the framework of the trailer at a short distance foreward of the prow. To this end, the longitudinally-extending side members 42, 43 of the trailer framework will be fitted with a crosspiece, such as a transversely-extending angle iron member 44 secured in place as by bolts 45, at a central position along which the web portion 46 of the U-shaped bracket member 16 is secured as by a nut and bolt 47.

It will thus be understood that the prow tie-down mechanism 10 will ordinarily remain attached to the trailer framework. Upon loading of the boat to be transported on the trailer and after it is properly cradled, the turnbuckle 39 will be loosened in the ordinary fashion by turning its body portion 48 by hand or with a suitable tool, after which the turnbuckle hook will be engaged with the winch eye fitting 41 at the prow of the boat. The turnbuckle 39 will then be tightened to such an extent as will moderately stress the helical tension spring 24, 25, which thereby serve to exert a slight downward stress upon the prow of the boat in its trailered position. The stress thus placed on the helical tension springs 24, 25 will be such as serves to withdraw the piston connector end 13 of the hydraulic unit 11 partially outwardly of its cylinder. Thus, any tendency of the boat to bounce while being trailered over ordinary relatively smooth terrain will be inhibited when traveling over rough roads, particularly at higher speeds and with occassional potholes and the like the substantially greater stresses thereby imposed between the boat and the trailer framework at the prow end of the boat will overcome the tensional reactive force afforded by the tension springs 24, 25 and bring into play the dampening effect of the hydraulic unit 11 in the outward or lengthening direction. This serves to keep bouncing or jouncing of the boat with respect to the trailer to a minimum while at the same time providing for the relief of stresses that might otherwise be damaging either to the boat or to the trailer. Because of its single direction action, as soon as the boat has moved under stress to its fullest outward extent, the tension spring 24, 25 serve immediately to re-set the boat in fully cradled position without bouncing because of the dampening effect of the hydraulic unit 11 in the outward or extending direction. Because of its normal or rest position the piston of the hydraulic unit 11 is partially withdrawn, as described above, overtravel of the prow of the boat in its return to rest position after a bouncing movement cannot cause the piston to "bottom out," thereby minimizing the possibility of the hook 40 becoming unhooked with respect to the prow winching eye fitting 41.

While I have illustrated and described herein only one form in which my invention can conveniently be embodied in practice, it is to be understood that this embodiment is presented by way of example only and not in a limiting sense. The invention, in brief, comprises all the embodiments and modifications coming within the scope and spirit of the following claims.

What I claim as new and desire to secure by Letters Patent is:

1. A prow tie-down device for boat trailers comprising a single-acting hydraulic unit having a cylinder connector end and a piston connector end, tension spring means connected in tandem with said hydraulic unit and between said cylinder connector end and said piston connector end, said single-acting hydraulic unit being slow-acting in the direction of outward movement of said piston connector end with respect to said cylinder connector end whereby said tension spring means provides for quick return of said piston connector end, means for connecting one of said slingle-acting hydraulic unit connector ends to the framework of a boat trailer, and means for connecting the other connector end of said hydraulic unit to the winching eye at the prow of a boat cradled on the trailer for trailering, said tension spring means comprising a pair of helical springs arranged in diametrically-opposed relation with respect to the longitudinal axis of said hydraulic unit, said means for connecting said other connector pin of said hydraulic unit to said winching eye comprises a turnbuckle having a hook at one end adapted to hookingly engage with the winching eye.

2. A prow tie-down device for boat trailers as defined in claim 1, wherein said means for connecting said piston connector end and said cylinder unit connector end each comprises a U-shaped bracket member having leg portions stradling their respective connector end and journal pin means extending transversely through said U-shaped bracket member legs and an opening in their respective connector end.

3. A prow tie-down device for boat trailers as defined in claim 2, wherein said helical springs are each formed with longitudinally-outwardly-extending eyes at each end, said eyes being disposed, one each, between inside portions of said U-shaped bracket legs and said hydraulic unit connector ends, and said journal pin means extending through said helical tension spring eyes at each of said connector ends.

* * * * *